United States Patent [19]

Fukuchi et al.

[11] Patent Number: 4,605,109
[45] Date of Patent: Aug. 12, 1986

[54] TOTALLY SYNCHRONIZED MANUAL TRANSMISSION UNIT FOR USE IN A VEHICLE

[75] Inventors: Hisashi Fukuchi; Masayuki Shibuya; Yasuie Takahashi, all of Toyota, Japan

[73] Assignee: Toyota Jidosha Kabushiki Kaisha, Aichi, Japan

[21] Appl. No.: 625,129

[22] Filed: Jun. 27, 1984

[30] Foreign Application Priority Data

Jul. 2, 1983 [JP] Japan ............................ 58-120749

[51] Int. Cl.$^1$ .................. B60K 41/26; G05G 5/10; G05G 9/12
[52] U.S. Cl. .................................. 192/4 C; 74/411.5; 74/475; 74/477
[58] Field of Search ................ 74/411.5, 475, 477; 192/4 A, 4 C

[56] References Cited

U.S. PATENT DOCUMENTS

4,510,818  4/1985  Inui ........................... 74/411.5 X
4,510,819  4/1985  Inui ........................... 74/411.5 X Primary Examiner—Allan D. Hermann
Attorney, Agent, or Firm—Parkhurst & Oliff

[57] ABSTRACT

A gear-shift mechanism for a transmission unit which includes a fork shaft slidably supported in a housing assembly which is selectively shifted from its neutral position to forward and reverse positions, a detent mechanism for selectively retaining the fork shaft in its neutral and shifted positions, a shift head member slidable on the fork shaft, a one-way engagement mechanism for effecting the engagement between the shift head member and the fork shaft during axial displacement of the fork shaft toward and away from its reverse position, and a shift arm member pivotably mounted to the inner wall structure of the housing assembly and linked with the shift head member to retain an idler gear in its neutral position and engage the same with driving and driven gears. The detent mechanism includes a first holder member having a slot in its upper portion and a shaft fixed to the upper side portion of the first holder member and a second holder member fitted into the first holder member. The head portion of the shaft fixed to the first holder member can be engaged with another head portion provided at a select return spring holder. The second holder member retains one of synchronizers in a neutral position when shifted to a reverse speed.

15 Claims, 9 Drawing Figures

TOTALLY SYNCHRONIZED MANUAL TRANSMISSION UNIT FOR USE IN A VEHICLE

BACKGROUND OF THE INVENTION

The present invention relates to a manual transmission unit for use in a vehicle, and more particularly to an improvement in the manual transmission unit possessing synchronizers and at least one unsynchronized gear, such as a reverse one.

A widely known manual transmission has input and output shafts supported in a parallel relationship to each other within a housing assembly for the unit, an idler shaft supported in a parallel relationship to the shafts from the housing assembly, driving and driven gears respectively mounted on the input and output shafts, an idler gear which is axially slidable on the idler shaft, a folk shaft which is slidably supported in a parallel relationship to the idler shaft from the housing assembly and is operatively connected to a manual shift lever which is selectively shifted from its neutral position to a forward or reverse position, a detent mechanism mounted on the housing assembly for selectively retaining the fork shaft in its neutral and shifted positions under a resilient load acting thereon, a shift head member which is slidable on the fork shaft, a one-way engagement mechanism for effecting the engagement of the shift head member with the fork shaft through the axial movement of the fork shaft toward and away from its reverse position, and a shift arm member pivoted to the inner wall structure of the housing assembly and linked with the shift head member, wherein the idler gear is carried by the shift arm member to be retained in its neutral position and to be engaged with the driving and driven gears through the axial movement of the fork shaft to its reverse position.

The reverse gear is usually constructed so that it is unsynchronized. Therefore, even after the vehicle comes to a complete stop, the input shaft, which runs into the transmission, is still rotating because of inertia. Hence, if an operator shifts into reverse while the input shaft is still rotating, a grinding noise may generate in the transmission resulting from the engagement between a rotating reverse driving gear, which is connected to the input shaft, and a stationary reverse idler gear. This results in discomfort to the operator and undesired wear on the gears.

To overcome the foregoing drawbacks, U.S. Application Ser. No. 532,480 (Filing Date, Sept. 15, 1983) TOTALLY SYNCHRONIZED MANUAL TRANSMISSION UNITS FOR USE IN A VEHICLE has been proposed. According to this proposed invention, a holder member is employed for holding shift heads except selected shift head when a select operation is made by an operator. When a reverse speed is selected, synchronizers for forward positions is effected to decrease or stop the rotation of the input shaft caused by inertia, thereby resulting in the decrease in a grinding noise generated by the engagement between a rotating reverse driving gear and a stationary reverse driven gear.

However, according to this proposed apparatus, a sleeve, on which a reverse driven gear is provided, is axially displaced at a reverse shift, resulting in the synchronization by the synchronizer employed at a reverse shift. It is not preferable to effect such a synchronizer, from the standpoint of the endurance of the synchronizer.

SUMMARY OF THE INVENTION

The present invention was made in view of the foregoing background and to overcome the foregoing drawbacks. It is accordingly an object of this invention to provide an improved manual transmission unit for use in a vehicle.

To attain the above objects, a vehicle having an engine and a manual transmission unit in accordance with the present invention comprises:

a housing assembly;

an input shaft connected to the engine;

an output shaft supported in a parallel relationship to the input shaft within the housing assembly;

a forward input gear integral with the input shaft;

a forward output gear rotatably mounted on the output shaft and constantly meshing with the forward input gear;

synchronizing means which are slidably mounted on one of the input and output shafts and rotatable therewith;

first actuating means for shifting the synchronizing means toward or away from one of the forward input or output gears;

a reverse input gear integral with the input shaft;

an idler shaft supported in a parallel relationship with the input and output shafts within the housing assembly;

a reverse sliding gear mounted on the idler shaft;

a reverse output gear mounted on the output shaft;

a second actuating means for shifting the reverse sliding gear into meshing engagement with the reverse input and output gears;

a manual shift lever for changing gearing ratios between the input shaft and output shaft;

a shift-and-select shaft supported in a parallel relationship with the input and output shafts within the housing assembly and operatively connected to the manual shift lever;

a fork shaft slidably supported in a parallel relationship with the idler shaft from the housing assembly and operatively connected to a manual shift lever which is selectively shifted by the operator between its neutral, forward and reverse positions;

a detent mechanism mounted in the housing assembly to selectively retain the fork shaft in its neutral or shifted positions when subjected to a resilient load acting thereon, the detent mechanism comprising a first holder member and a second holder member, the first holder member being slidable on the shift-and-select shaft and rotatable relative to the housing assembly, the first holder member whose rotation results in the movement of the synchronizing means, the first holder member having a first projection, a slot for allowing the rotation of the first holder member when sifting into reverse gear, and a pawl which prevents a double shift in association with the first actuating means, the pawl including a means for retaining one of the synchronizing means associated with the reverse gear in neutral position when the manual shift lever is shifted to a reverse speed, the second holder member having an engagement member which selectively engages with the first holder member, corresponding to the retained neutral position of one of the synchronizing means; and rotating means rotated by the manual shift lever, having a second projection, the second projection engaged with the first projection of the first holder member when the first holder member slides upon shifting into reverse gear, whereby the rotation of the manual shift lever results in the rotation of the first holder member because of the engagement between the first projection and the second projection, resulting in the coupling of the synchronizing means.

BRIEF DESCRIPTION OF THE DRAWINGS

The above objects, features and advantages of the present invention will become more apparent from reading the following description of the preferred embodiments taken in connection with the accompanying drawings wherein.

DETAILED DESCRIPTION OF THE PREFERRED EMBODIMENTS

The present invention is described in detail with reference to the accompanying drawings which illustrate various embodiments of a manual transmission unit for use in a vehicle in accordance with the present invention.

Figure 1:
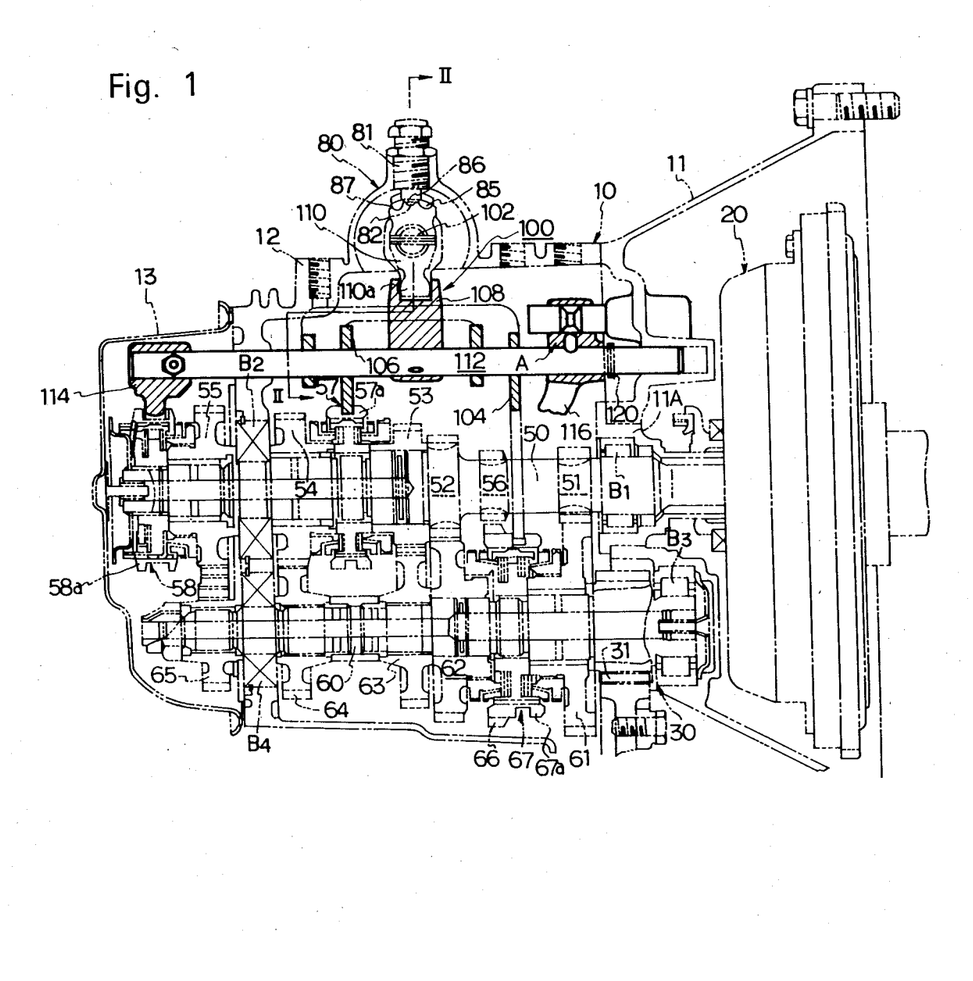
FIG. 1 illustrates an arrangement of a gear-shift mechanism for a manual transmission unit in accordance with the present invention.

FIG. 1, illustrates an arrangement of a gear-shift mechanism 100 in a transmission unit in which the present invention is applied. The manual transmission, shown in FIG. 1, has five forward and one reverse positions therein, and is illustrated as a transmission which is applied into a front engine front drive automobile. The manual transmission unit includes a housing assembly 10 composed of a clutch housing 11, a transmission casing 12 and a cover plate 13. The clutch housing 11 is secured to the cylinder block of a transversely mounted internal combustion engine by its right end seating face and contains a clutch assembly 20 therein. The structure for five forward and one reverse positions is provided within the transmission casing 12. The structure for a fifth forward position is provided within the space defined within the cover plate 13. The transmission casing 12 is secured to the clutch housing 11 at its right end seating face in a fluid-tight manner and carries thereon a final drive gear 30 which is located adjacent to the lower portion of the clutch assembly 20. The clutch assembly 20 is to transmit an engine torque to the gear-shift mechanism 100 or to disengage the transfer of the engine torque to the gear-shift mechanism 100. The left end of the transmission casing 12 is closed and sealed by the cover plate 13 to retain lubricating oil within the housing assembly 10.

Assembled within the housing assembly 10 is an input shaft 50 which is coaxially arranged with an output member of the clutch assembly 20 in a parallel relationship to an output shaft 60. The input shaft 50 is supported by a pair of axially spaced bearings $B_1$ and $B_2$ to be rotatable on the clutch housing 11 and the transmission casing 12, respectively. The bearing $B_1$ is located in the clutch housing 11 and the bearing $B_2$ is located in the transmission casing 12. The input shaft 50 is provided with forward driving gears 51–55 (51: a first driving gear, 52: a second driving gear, 53: a third driving gear, 54: a fourth driving gear, 55: a fifth driving gear), a reverse driving gear 56, and hub sleeves 57 and 58 for third/fourth and fifth gears respectively. The bearing $B_1$ is held in place by a cylindrical bearing retainer 11A which is fitted into the clutch housing 11. The two driving gears 51, 52 and the reverse driving gear 56 are integrally provided on the input shaft 50. The other driving gears 53, 54 and 55 are provided to be rotatable on the input shaft 50.

The output shaft 60 is supported by a pair of axially spaced bearings $B_3$ and $B_4$ to be rotatable on the clutch housing 11 and the transmission casing 12, respectively. The bearing $B_3$ is located in the clutch housing 11 and the bearing $B_4$ is located in the transmission casing 12. The output shaft 60 is provided with forward driven gears 61–65 (61: a first driven gear, 62: a second driven gear, 63: a third driven gear, 64: a fourth driven gear, 65: a fifth driven gear), a reverse driven gear 66 and a hub sleeve 67a for first/second gears. The output shaft 60 is further provided thereon with a final driven gear 31 of the final drive gear 30. The two driven gears 61 and 62 are provided to be rotatable on the output shaft 60. The three driven gears 63, 64 and 65 are connected by a spline, a serration or a key to the output shaft 60, and are provided to be rotated with the output shaft 60.

Three synchronizers 67, 57 and 58 are provided within the transmission casing 12. The first synchronizer 67 is located on the output shaft 60 at the position between the first driven gear 61 and the second driven gear 62. The second synchronizer 57 is located on the input shaft 50 at the position between the third driving gear 53 and the fourth driving gear 54. Further, the third synchronizer 58 is located on the input shaft 50 at the position adjacent to the fifth driving gear 55. The forward gear shift positions are obtained by the axial displacement of sleeves 67a, 57a and 58a of the synchronizers 67, 57 and 58. When the sleeve 67a of the first synchronizer 67 is axially displaced to the right in FIG. 1, the forward first shift position is made. Contrary to this, when the sleeve 67a of the first synchronizer 67 is axially displaced to the left in FIG. 1, the forward second shift position is made. Similarly, when the sleeve 57a of the second synchronizer 57 is axially displaced to the right in FIG. 1, the forward third shift position is made. When the sleeve 57a of the second synchronizer 57 is displaced to the left in FIG. 1, the forward fourth shift position is made. Further, when the sleeve 58a of the third synchronizer 58 is displaced to the right in FIG. 1, the forward fifth shift position is made.

Figure 4:
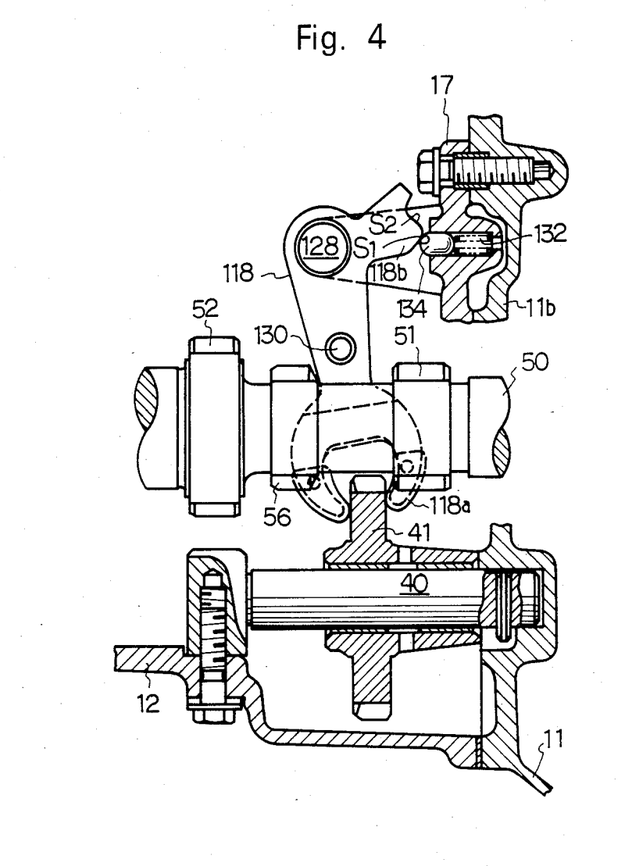
FIG. 4 is an enlarged sectional view illustrating the reverse idler portion of the gear-shift mechanism in its neutral position.

Next, the reverse shift position is made as follows: The reverse driving gear 56 is integrally provided on the input shaft 50. The reverse driven gear 66 is formed on a portion extended from the sleeve 67a of the first synchronizer 67. As shown in FIG. 4, a reverse idler gear 41 is provided to be slidable on a reverse idler shaft 40. When the reverse idler gear 41 is displaced to the left in FIG. 4, the reverse idler gear 41 meshes with the reverse driving gear 56 and further with the reverse driven gear 66 which is formed on the portion extended from the sleeve 67a of the first synchronizer 67. Thus, the reverse shift position is made. The reverse idler shaft 40, as shown in FIG. 4, is provided in a parallel relationship to the input shaft 50 and the output shaft 60 in the transmission casing 12. The reverse idler shaft 40 is fixed to the clutch housing 12 and the transmission casing 12 at both axial ends thereof.

Thus obtained output of each shift position is transmitted to the output shaft 60. This rotation of the output shaft is transmitted from the final driving gear 30 to the final driven gear 31.

Next, the mechanism for obtaining each shift position is explained in conjunction with the operation of the sleeves 67a, 57a and 58a of the synchronizers 67, 57 and 58.

Figure 2:
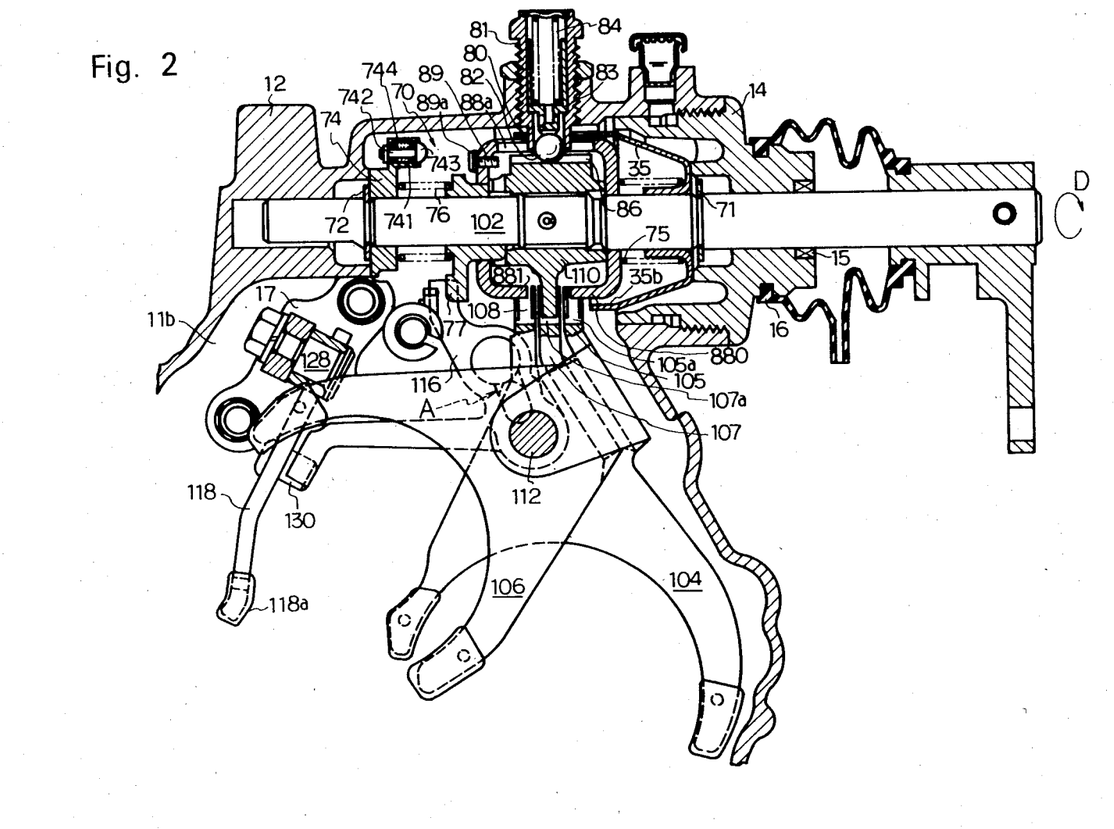
FIG. 2 is an enlarged sectional view taken along the line II—II of FIG. 1.
Figure 7:
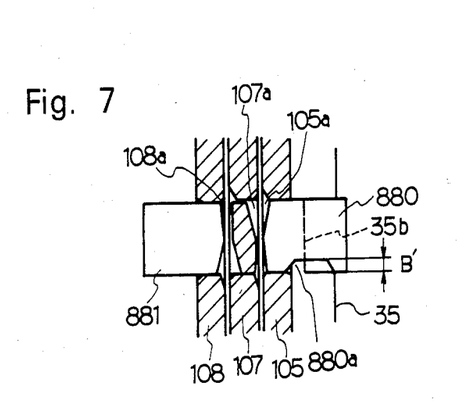
FIG. 7 is a schematic view illustrating the engagement between locking pawls of the first holder member and shift heads when in a neutral position.

The sleeve 67a of the first synchronizer 67 is displaced by a first shift fork 104 which is slidably mounted on a fork shaft 112. The first shift fork 104 has a first shift head 105 at upper portion thereof, as shown in FIGS. 2 and 7. Similarly, the sleeve 57a of the second synchronizer 57 is displaced by a second shift fork 106 which is slidably mounted on the fork shaft 112. The second shift fork 106 has a second shift head 107 at upper portion thereof, as shown in FIGS. 2 and 7. The sleeve 58a of the third synchronizer 58 is displaced by a third shift fork 114 which is fixed to the fork shaft 112. A third shift head 108 shown in FIGS. 1, 2 and 7, is secured onto the fork shaft 112. The fork shaft 112 is mounted on the transmission casing 12 and the clutch housing 11 in such a condition as the fork shaft 112 is slidable in its axial direction.

Figure 3:
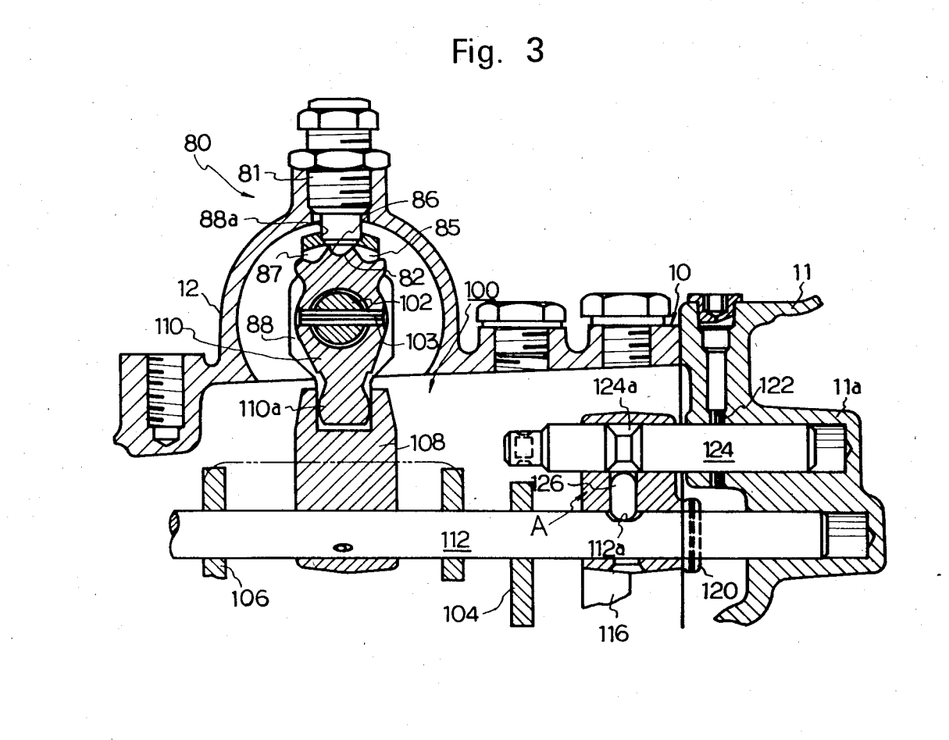
FIG. 3 is an enlarged sectional view illustrating a portion of FIG. 1.

Assembled within the upper portion of the transmission casing 12 is a shift-and-select shaft 102 of the gearshift mechanism 100 for changing the gear ratio between the output and input shafts 60 and 50. FIG. 2 shows an enlarged sectional view of the afore-mentioned housing assembly 10. The shift-and-select shaft 102 is integrally provided with an inner lever member 110 which is selectively brought into engagement with each head of shift forks 104, 106 and the shift head 108. The shift-and-select shaft 102 rotates and slides within the transmission casing 12 and the cover member 14, which act as supports for the shaft 102. The shift-and-select shaft 102 is threaded through the transmission casing 12 in a fluid-tight manner, and extends outwardly from the cover member 14 by utilizing an oil seal member 15 and a dust boot 16. The end of the shift-and-select shaft 102 which extends through the cover member 14 is operatively connected through a shifting linkage (not shown) to a manual shift lever which causes the axial displacement of the shift-and-select shaft 102 in the selecting operation and a rotation of the shift-and-select shaft 102 in the shifting operation. An inner lever member 110, a first holder member 88 and a second holder member 35 are mounted on the shift-and-select shaft 102. The inner lever member 110 has a spline engagement with the shift-and-select shaft 102, and further a pin 103 shown in FIG. 3 is fitted between the shift-and-select shaft 102 and the inner lever member 110. Hence, the inner lever member 110 is slid and rotated with the shift-and-select shaft 102.

The inner lever member 110 has a lower member 110a at lower portion thereof. This lower member 110a is designed to selectively engage with one of the shift heads 105, 107 and 108. The shift heads 105, 107 and 108 are layouted in a parallel relationship to each other as shown in FIGS. 2, 7, 8 and 9. These shift heads 105, 107 and 108 have slots 105a, 107a and 108a, respectively. The lower member 110a of the inner lever member 110 engages with one of the slots, and one of shift heads is selected. The shift-and-select shaft 102 is further provided with a select return mechanism 70 and a detent mechanism 80.

The select return mechanism 70 retains the manual shift lever in its neutral position. The select return mechanism 70 includes a pair of axially spaced fasteners (E-shaped rings) 71 and 72 fixed to the shift-and-select shaft 102, a pair of axially spaced spring holders 74 and 35 (a second holder member 35) slidable on the shift-and-select shaft 102, a pair of axially spaced compression coil springs 75 and 76 which circumferentially surround the shift-and-select shaft 102, and a reverse restriction lever 77. The spring holder 74, which has a spline relationship with the shift-and-select shaft 102 and is therefore rotatable with the shift-and-select shaft 102, extends radially outward to form a flange 741 in which a shaft 742 having an enlarged head portion 743 is provided. A compression coil spring 744 provided in the flange 741 biases the shaft 742 in a direction toward the right in FIG. 2. The spring holder 74 is connected to the shift-and-select shaft 102 by the fastener 72 which provides for free movement of the holder 74 with the shaft 102 when shifting into first or second gear, which corresponds to the shaft 102 moving toward the right in FIG. 2. However, when the shift-and-select shaft 102 is moved for shifting into fifth or reverse gears, corresponding to movement toward the left in FIG. 2, the spring holder 74 freely moves with the shaft 102 until the spring holder 74 abuts against the inner wall of the transmission casing 12. The reverse restriction lever 77 acts as a stopper for the select return mechanism 70 and in a conventional manual transmission, prevents an accidental shifting into reverse gear. The select return mechanism 70 retains the shift-and-select shaft 102 in its neutral position to maintain the engagement between the inner lever member 110 and the head of the shift fork 106 when shifting between third and fourth gears.

The detent mechanism 80 is shown in FIGS. 1, 2 and 3. The detent mechanism comprises a cylindrical plug 81 which is threaded into the transmission casing 12, a metallic ball 82 assembled within the inner end portion of the plug 81 and rotates therein, a cylindrical ball retainer 83 which axially slides within the plug 81 and retains the ball 82 in place, and a compression coil spring 84 assembled within the plug 81 which presses the ball 82 toward the inner lever member 110. Hence, the rotational position of the inner lever member 110, which corresponds to the position for the shift operation, is securely positioned. The head of the inner lever member 110 comprises three equiangular, equally spaced axial detent grooves 85, 86 and 87 wherein the ball 82 is selectively retained per the resultant load from the spring 84. The axial detent grooves 85, 86 and 87 are parallel with the longitudinal axis of the shift-and-select shaft 102. The detent mechanism 80 further comprises the first holder member 88 which is mounted on the shift-and-select shaft 102 and rotates and slides thereon.

Figure 5:
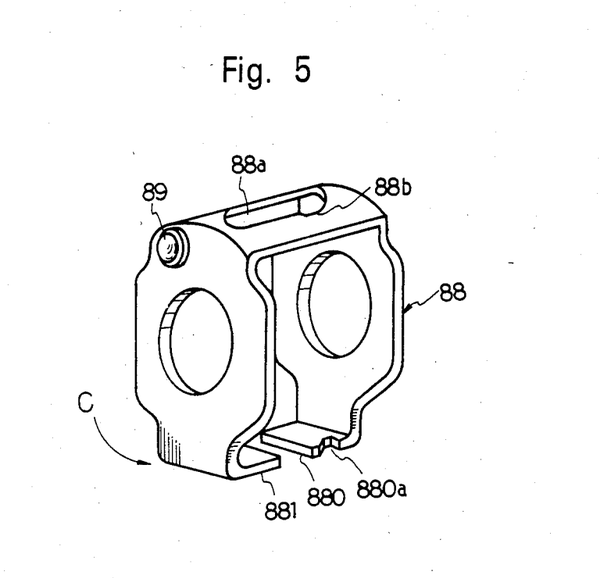
FIG. 5 is a perspective view illustrating a first holder member having an axial hole in its upper portion.

The first holder member 88 is shown in more detail in FIG. 5. The first holder member 88 is provided in such a condition as the first holder member 88 encircles the inner lever member 110 as shown in FIG. 2. The first holder member 88 has an axial slot 88a–88b machined into it through which the inner end of the plug 81 extends. The axial slot 88a extends in the axial direction of the shift-and-select shaft 102. Hence, the first holder member 88 cannot be rotated by the plug 81 and is fixed to the transmission casing 12. However, the first holder member 88 can be slided with the inner lever member 110, in the axial direction of the shift-and-select shaft 102. A screw 89, having a head portion 89a, is threaded into the first holder member 88 near the axial slot (88a) of the machined axial slot 88a–88b. When the manual shift lever is shifted into either reverse or fifth gear, the first holder member 88 moves axially with the shift-and-select shaft 102 toward the head portion 743 of the shaft 742, thereby compressing the spring 76, resulting in the engagement between the head portion 743 and the first holder member 88. Therefore, when the head portion 743 is engaged with the enlarged head portion 89a of the screw 89, the rotation of the shift-and-select shaft 102 is transmitted to the first holder member 88 through the spring holder 74.

There are provided two pawls 880 and 881 at the lower portion of the first holder member 88. As shown in FIG. 2, the pawls 880 and 881 are positioned on the both sides of the lower member 110a of the inner lever member 110. The pawls 880 and 881 fit into two slots among three slots 105a, 107a and 108a of the shift heads 105, 107 and 108. The shift heads in which two pawls 880 and 881 are fitted, are fixed by two pawls 880 and 881, resulting in the prevention of double shift.

Figure 6:
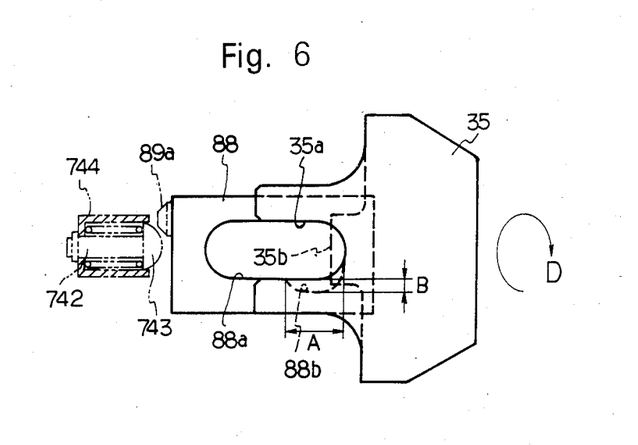
FIG. 6 is a schematic view illustrating the engagement between first and second projections.

The end 88b of the slot 88a–88b is larger than the end 88a of the slot by an amount A in the slot's longitudinal direction and an amount B in the slot's transverse direction, as disclosed in FIG. 6. This permits the first holder member 88 to rotate in the direction D by an amount B without any corresponding rotation of the shaft 102. In this condition, the screw 89 is maintained to be engaged with the head portion 743 of the shaft 742. The slot 88b is provided at the position corresponding to the position where the lower member 110a of the inner lever member 110 selects the third shift head 108. When the first holder member 88 rotates with the shaft 102 from the position shown in FIG. 8 in the direction C, shown in FIG. 5, the pawls 880 and 881 of the first holder member 88 rotate the shift heads 105 and 107, as shown in FIG. 7. However, the first shift head 105 is interlocked by a second holder member 35. Hence, only the second shift head 107 is rotated to effect the synchronizer 57. The undesirable effects of double shifting the gears 64 and 62, corresponding to the hub sleeves 57a and 67a respectively, is thereby prevented so long as the appropriate length B for preventing the double shift is predetermined.

When the first holder member 88 is caused to rotate more than the length B, through the rotation of the shift-and-select shaft 102, the head portion 743 of the shaft 742, engaged with the head portion 89a of the screw 89 as shown in FIG. 6 is caused to disengage against the force of the coil spring 744. When the head portion 743 of the shaft 742 is engaged with the head portion 89a of the screw 89, the lower member 110a of the inner lever member 110 is fitted into the slot 108a of the third shift head 108. After the disengagement, the shift-and-select shaft 102 is rotatable relative to the first holder member 88. However, when the plug 81 is positioned in the narrow hole 88a, the first holder member 88 cannot be rotated because there is not enough space provided between the plug 81 and the inner wall of the hole 88a. In this situation, the first holder member 88 is positioned by the opposing forces exerted by the compression coil springs 75 and 76 thereby restricting the axial movement of the first shift head 105 and the third shift head 108 along the fork shaft 112. Therefore, the detent mechanism 80 defines each neutral and shifted position of the shift forks 104 and 106 and the third shift head 108. The third shift head 108 is mounted on the fork shaft 112 which receives axial slidable support from the clutch housing 11 and the transmission casing 12. The fork shaft 112 is axially displaced in the selecting operation of moving the shift lever toward the forward fifth speed position or the reverse position and is positioned in its shifted state through the operation of the detent mechanism 80.

A second holder member 35 is slidably provided on the shift-and-select shaft 102 on the right side of the first holder member 88, as shown in FIG. 2. As shown in FIG. 6, the second holder member 35 has a U-shaped slot 35a at upper surface thereof, in which the plug 81 fits. The faster 71 fastens the second holder member 35 on the shift-and-select shaft 102. The coil spring 75 is provided between the first holder member 88 and the second holder member 35. Hence, the second holder member 35 moves to the left by the biasing force of the fastener 71 (E ring) when the shift-and-select shaft 102 axially moves to the left in FIG. 2. The rotation of the second holder member 35 is stopped as the plug 81 fits into the U-shaped slot 35a.

Further, the second holder member 35 has an engagement member 35b at upper portion thereof. The engagement member 35b is designed to fit into the slot 105a of the first shift head 105 when the shift-and-select shaft 102 moves to the left and the lower member 110a of the inner lever member 110 selects the third shift head 108.

The pawls 880 of the first holder member 88 has a slot 880a at the position corresponding to the axial slot 88b. This slot 880a has a concavity whose length is B' corresponding to the length B of the axial slot 88b shown in FIG. 6. The slot 880a is provided at the position of the first shift head 105 when the lower member 110a of the inner lever member 110 selects the third shift head 108.

The gear-shift mechanism 100 comprises the shift-and-select shaft 102, the shift forks 104 and 106, the third shift head 108, the inner lever member 110, the fork shaft 112, a third shift fork 114 fixed to the left end of the fork shaft 112 for a fifth gear, a reverse shift fork 116 connected to the fork shaft 112 through a one-way engagement mechanism A, and a shift arm 118 linked with the reverse shift fork 116. This reverse shift fork 116 is fitted to and mounted on the fork shaft 112 and a counter shaft which is provided in a parallel relationship to the fork shaft 112 and is fixed to the clutch housing 11. The one-way engagement mechanism A comprises a spring pin 120 fixed to the fork shaft 112 and designed so that it abuts against the right end of the reverse shift fork 116 as shown in FIGS. 1 and 3. The fork shaft 112 is provided with an annular recess 112a, and the counter shaft 124 is also provided with an annular recess 124a. The counter shaft 124 is provided in the portion 11a of the clutch housing 11 in a parallel relationship to the fork shaft 112, and is held in place by a spring pin 122. The one-way engagement mechanism A further comprises a locking means (e.g. a lock pin 126) which has radial movement capabilities within the head portion of the reverse shift fork 116 to selectively engage the annular recess 112a or 124a thereby effecting engagement between the reverse shift fork 116 with the fork shaft 112 or the counter shaft 124. By utilizing the structure of the one-way engagement mechanism A, when the fork shaft 112 is displaced to the right in FIG. 3 in order to obtain the forward fifth shift position, the lock pin 126 engages with the annular recess 124a of the counter shaft 124, and the reverse shift fork 116 is maintained to be locked to the counter shaft 124. Contrary to this, when the fork shaft 112 is displaced to the left in FIG. 3, the reverse shift fork 116 is pressed with the biasing force of the spring pin 120, and the lock pin 126 engages with the annular recess 112a of the fork shaft 112. Thus, the reverse shift fork 116 becomes integral with the fork shaft 112 in one body. Hence, the reverse shift fork 116 is displaced to the left 112 with the fork shaft 112. In this condition, the third shift fork 114 is also displaced to the left in FIG. 1, but the shift fork 114 is only displaced as there is provided no gear on the left side of the third synchronizer 58.

The displacement of the reverse shift fork 116 is transmitted through the shift arm 118 shown in FIG. 4 to the reverse idler gear 41, resulting in the displacement of the reverse idler gear 41. The reverse idler gear 41 is designed to slide on a shaft 128 according to the rotation of the shift arm. Fork portions 118a of the shift arm 118 grasp the reverse idler gear 41 therebetween, and displace the reverse idler gear 41 on the reverse idler shaft 40. There is provided a pin 130 in the shift arm 118. The reverse shift fork 116 engages with this pin 130, as shown in FIG. 2. Hence, the shift arm 118 is designed to be rotated by the displacement of the reverse shift fork 116. When the reverse shift fork 116 is displaced to the left in FIG. 3, the shift arm 118 is rotated in the clockwise direction.

FIGS. 2 and 4 show that the shift arm 118 pivots about a pin 128 which is fixed on a bracket 17 which in turn is bolted to the vertical wall 11b of the clutch housing 11. The reverse idler gear 41 can be brought into engagement with both the reverse driving and driven gears 56 and 66 respectively. When the third shift head member 108 is in its neutral position as shown in FIGS. 1 and 3, the shift arm 118 is in its neutral position and thereby retains the reverse idler gear 41 in its disengaged position as shown in FIG. 4. When the reverse shift fork 116 is shifted toward the reverse position, the shift arm 118 swings to effect the engagement between the reverse idler gear 41 with the reverse driving and driven gears 56 and 66.

In this embodiment, the shift arm 118 is designed with a cam portion 118b which is engaged with a cam follower 134 which is movable within a portion of a bracket 17. The cam follower 134 is loaded by a compression coil spring 132 within the bracket 17 which forces the cam follower 134 toward the cam portion 118b of the shift arm 118. FIG. 4 shows that there are two faces $S_1$ and $S_2$ provided on the cam portion 118b. When the cam follower 134 engages the face $S_1$, the shift arm 118 is in its neutral position, and when the cam follower 134 engages the face $S_2$, the shift arm 118 is in its reverse position. Referring to FIG. 4, the shift arm 118 experiences a counterclockwise force when the face $S_1$ is engaged with the cam follower 134 and a clockwise force when the face $S_2$ is engaged with the cam follower 134 because of the load exerted by the spring 132 through the cam follower 134. The actual force exerted upon the shift arm 118 is determined by the angle formed between the cam follower 134 and the faces $S_1$ and $S_2$ along with the stored force in the coil spring 132.

In this embodiment, the load on the shift arm 118 is designed to be less than that acting on the inner lever member 110 of the detent mechanism 80. Therefore, when the reverse shift fork 116 is in its neutral position or shifted away from its reverse position, the force acting upon the shift arm 118 is less than the force acting on the inner lever member 110 of the detent mechanism 80, but sufficient to separate the reverse idler gear 41 from both the reverse driving and driven gears 56 and 66. When the reverse shift fork 116 is shifted to the reverse position, the load acting upon the shift arm 118 is less than the load acting upon the inner lever member 110, but sufficient to effect the engagement of the reverse idler gear 41 with the reverse driving and driven gears 56 and 66.

In the operation of the gear-shift mechanism 100, when the shift-and-select shaft 102 is slid by the manual shift lever from its neutral position, shown in FIG. 2, to the right in FIG. 2, the lower member 110a of the inner lever member 110 selects the first shift head 105. In this condition, when the shift-and-select shaft 102 is rotated by the shift operation, the shift fork 104 integrally provided with the first shift head 105 displaces the sleeve 67a of the first synchronizer 67 to the right or left in FIG. 1, resulting in the achievement of the forward first or second speed. When the shift-and-select shaft 102 is rotated in the counterclockwise direction in FIG. 1 by the shift operation, the sleeve 67a is displaced to the right in FIG. 1, resulting in the achievement of the first speed. Contrary to this, when the shift-and-select shaft 102 is rotated in the clockwise direction in FIG. 1, the sleeve 67a is displaced to the left in FIG. 1, resulting in the achievement of the second speed. In this circumstance, the pawl 881 of the first holder member 88 engages with the grooves 107a and 108a of the second and third shift heads 107 and 108. Hence, the second and third shift heads 107 and 108 are interlocked.

Next, the lower member 110a of the inner lever member 110 selects the second shift head 107 in the condition shown in FIG. 2. Further, when the shift-and-select shaft 102 is rotated by the shift operation, the shift fork 106 integrally provided with the second shift head 107 displaces the sleeve 57a of the second synchronizer 57 to the right or left in FIG. 1, resulting in the achievement of the forward third or fourth speed. When the shift-and-select shaft 102 is rotated in the counterclockwise direction by the shift operation, the sleeve 57a is displaced to the right in FIG. 1, resulting in the achievement of the forward third speed. Contrary to this, when the shift-and-select shaft 102 is rotated in the clockwise direction, the sleeve 57a is displaced to the left in FIG. 1, resulting in the achievement of the forward fourth speed. In this circumstance, as shown in FIG. 7, the pawl 880 of the first holder member 88 engages with the groove 105a of the first shift head 105, and another pawl 881 engages with the groove 108a of the third shift head 108. Hence, the first and third shift heads 105 and 108 are interlocked.

When the shift-and-select shaft 102 is displaced from the position shown in FIG. 2 to the left by the select operation, the lower member 110a selects the third shift head 108. In this condition, when the shift-and-select shaft 102 is rotated by the shift operation, the fork shaft 112 fixed to the third shift head 108 is displaced to the right or left in FIG. 1, resulting in the achievement of the forward fifth or reverse speed. When the shift-and-select shaft 102 is rotated in the counterclockwise direction in FIG. 1, the fork shaft 112 is displaced to the right. Hence, the shift fork 114 fixed to the fork shaft 112 also moves to the right. According to this movement of the fork shaft 112, the sleeve 58a of the third synchronizer 58 also is displaced to the right, resulting in the achievement of the forward fifth speed. Contrary to this, when the shift-and-select shaft 102 is rotated in the clockwise direction by the shift operation, the fork shaft 112 is displaced to the left in FIG. 2. In this condition, the reverse shift fork 116 is integrally provided with the fork shaft 112 with regard to axial displacement thereof as the one-way engagement mechanism A is provided between the reverse shift fork 16 and the fork shaft 112. Hence, the reverse shift fork 116 rotates the shift arm 118 shown in FIG. 4 in the clockwise direction, and this displaces the reverse idler gear 41 to the left, resulting in the engagement with the reverse driving gear 56 shown in FIG. 1 and the reverse driven gear 66 formed on the sleeve 67a of the first synchronizer 67. Thus, the reverse speed is obtained.

Figure 8:
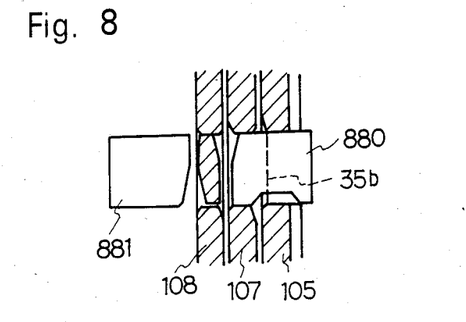
FIG. 8 is a schematic view illustrating the engagement between locking pawls of the first holder member and shift heads when a reverse select is made.

In this circumstance, as shown in FIG. 8, the pawl 880 of the first holder member 88 engages with the slots 105a and 107a of the first and second shift heads 105 and 107. Hence, the first and second shift heads 105 and 107 are interlocked. Further, in this circumstance, the engagement member 35b of the second holder member 35 engages with the slots 105a of the first shift head 105. Hence, the first shift head 105 is interlocked by the engagement member 35b and the pawl 880.

When the pawl 880 of the first holder member 88 engages with the slots 105a and 107a of the first and second shift heads 105 and 107, the first projection fixed on the side surface of the first holder member 88 (i.e., the screw 89) engages with the second projection means (i.e., shaft 742) of the spring holder 74, as shown in FIG. 6. When the shift-and-select shaft 102 rotates in a direction to obtain reverse speed, the first holder member 88 rotates by the length B a second hole (e.g. the slot 88b).

The first holder member 88 rotates about the shift-and-select shaft 102 when the shift-and-select shaft rotates, because a rotating means (e.g., spring holder 74) engages with the shift-and-select shaft 102 in a spline relationship and the enlarged head portion of the shaft 742, which is mounted on the spring holder 74, is in contact with a head portion 89a of the screw 89, which is secured to the first holder member 88. Therefore, when the shift-and-select shaft 102 is moved to the left in FIG. 2 and the inner lever member 110 selects the third shaft head 108, the enlarged head portion 743 of the shaft 742 contacts the head portion 89a of the screw 89. When the shift-and-select shaft 102 rotates, the enlarged head portion 743 of the shaft 742 rotates the screw 89 with the first holder member 88 about the shift-and-select shaft 102.

Figure 9:
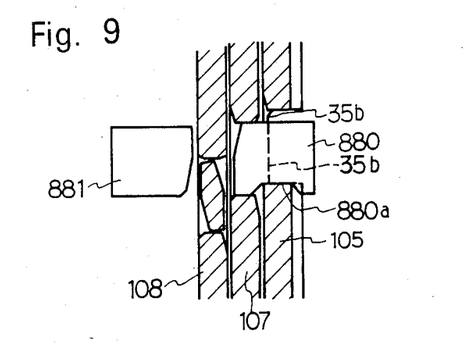
FIG. 9 is a schematic view illustrating the engagement between locking pawls of the first holder member and shift heads when a reverse shift is made.

FIG. 9 shows the condition that the first holder member 88 is rotated by the length B. As shown in FIG. 9, the second shift head 107 is displaced by the pawl 880 according to the rotation of the first holder member 88. This displacement of the second shift head 107 causes the leftward displacement of the shift fork 106 in FIG. 1. According to this leftward displacement of the shift fork 106, the sleeve 57a of the second synchronizer 57 is displaced to the left, and the effect of the synchronization is obtained. Hence, even in such a condition as a reverse shift operation is made while the input shaft 50 rotates by inertia after the clutch 20 is disengaged, the rotation of the input shaft 50 is decreased or dissolved by the effect of the synchronization of the second synchronizer 57. After the rotation of the input shaft 50 is thus decreased or the input shaft 50 stops, the reverse idler gear 41 becomes to mesh with the reverse driving gear 56 mounted on the input shaft 50 and the reverse driven gear 66 mounted on the output shaft 60. Hence, a grinding noise does not generate at its meshing time.

Moreover, the sleeve 57a of the second synchronizer 57 is displaced by the amount of the distance, but the amount of the distance is designed to be a distance sufficient to obtain the effect of the synchronization. Hence, the forward fourth speed is not accomplished when a reverse speed is shifted.

Further, according to the reverse shift operation, the shaft 742 shown in FIG. 6 rotates to get over the screw and return the first holder member 88 into the initial non-rotated position. Hence, the sleeve 57a of the second synchronizer 57 is in the neutral position that the synchronization is not effected.

In the above-described reverse shift operation, as the engagement member 35b of the second holder member 35 engages with the groove 105a of the first shift head 105, the first shift head 105 does not move. Even when the first holder member 88 rotates, the groove 880a of the pawl 880 prevents the first shift head 105 from being interfered with the first holder member 88. Hence, the first shift head 105 is securely interlocked. The sleeve 67a of the first synchronizer 67, which is operated by the shift fork 104 integrally provided with the first shift head 105, is maintained in the neutral position at the reverse shift operation. As a result, even in the case that a thrust is exerted on the sleeve 67a in the direction toward the forward second speed, the sleeve 67a is securely maintained by the second holder member 35 to the neutral position. Hence, the effect of the first synchronizer 67 is not obtained and this improves the endurance of the first synchronizer 67.

While the present invention has been described in its preferred embodiments, it is to be understood that the invention is not limited thereto and may be otherwise embodied within the scope of the following claims.

What is claimed is:

1. A gear-shift mechanism for a manual transmission unit for use in a motor vehicle, comprising:
   a housing assembly;
   an input shaft for connection to an engine;
   an output shaft supported in a parallel relationship to the input shaft within the housing assembly;
   a forward input gear integrally attached to the input shaft;
   a forward output gear mounted on the output shaft and constantly meshing with the forward input gear;
   synchronizing means which are slidably mounted on one of the input and output shafts and rotatable therewith;
   first actuating means for shifting the synchronizing means toward or away from one of the forward input or output gears;
   a reverse input gear integral with the input shaft;
   an idler shaft supported in a parallel relationship with the input and output shafts within the housing assembly;
   a reverse sliding gear mounted on the idler shaft;
   a reverse output gear mounted on the output shaft;
   second actuating means for shifting the reverse sliding gear into meshing engagement with the reverse input and output gears;
   a manual shift lever for changing gearing ratios between the input shaft and the output shaft;

a shift-and-select shaft supported in a parallel relationship with the input and output shafts within the housing assembly and operatively connected to the manual shift lever;

a fork shaft slidably supported in a parallel relationship with the idler shaft within the housing assembly and operatively connected to the manual shift lever for being selectively shifted by the operation between its neutral, forward and reverse positions;

a detent mechanism mounted in the housing assembly to retain selectively the fork shaft in its neutral or shifted positions when subjected to a resilient load acting thereon, the detent mechanism comprising a first holder member and a second holder member, the first holder member being slidable on the shift-and-select shaft and rotatable relative to the housing assembly, rotation of the first holder member resulting in the movement of said synchronizing means, the first holder member having a first projection, a slot for permitting the rotation of the first holder member when shifting into reverse speed and a pawl which prevents a double shift in association with the first actuating means, the pawl including a means for retaining one of the synchronizing means associated with the reverse gear in its neutral position when the manual shift lever is shifted to a reverse speed, the second holder member having an engagement member which selectively engages with the first holder member, corresponding to the retained neutral position of one of the synchronizing means; and rotating means rotated by the manual shift lever, having a second projection engaged with the first projection of the first holder member when the first holder member slides upon shifting into reverse speed, rotation of the manual shift lever resulting in the rotation of the rotating means because of the engagement between the first projection and the second projection, this resulting in the effect of the synchronizing means for a forward speed, whereby when the manual shift lever is shifted to a reverse speed, the synchronizing means for a forward speed are effected to stop the rotation of the input shaft by inertia and the synchronizing means associated with the reverse gear is maintained to its neutral position by the engagement member of the second holder member.

2. The gear-shift mechanism of claim 1, wherein the means for retaining the synchronizing means associated with the reverse gear in its neutral position is a groove.

3. The gear-shift mechanism of claim 1, wherein the movement of the manual shift lever is transmitted to the shift forks and rotating means by the shift-and-select shaft connected with the manual shift lever at one end, the other end of the shift-and-select shaft penetrating the first holder member to rotate with the rotating means at the other end of the shift-and-select shaft.

4. The gear-shift mechanism of claim 3, wherein the detent mechanism further comprises a locking means fixed onto the housing assembly for restricting the rotation of the first holder member, with the locking means projecting into the slot of the first holder member.

5. The gear-shift mechanism of claim 4, wherein the slot of the first holder member comprises a first hole in which the locking means is slidable with the sliding motion of the shift-and-select shaft, and a second hole in which the first holder member can be rotated a limited amount to effect the synchronization of the synchronizing means.

6. The gear-shift mechanism of claim 5, wherein the rotating means engages with the shift-and-select shaft, said rotating means comprising a flange portion extending radially outward therefrom.

7. The gear-shift mechanism of claim 6, wherein the detent mechanism further comprises return springs which are provided between the shift-and-select shaft and the first holder member, retaining the shift-and-select shaft in its neutral position.

8. A gear shift mechanism for a manual transmission unit for use in a motor vehicle, comprising:

a housing assembly;

an input shaft for connection to an engine;

an output shaft supported in a parallel relationship to the input shaft within the housing assembly;

a forward input gear integrally attached to the input shaft;

a forward output gear mounted on the output shaft and constantly meshing with the forward input gear;

synchronizing means which are slidably mounted on one of the input and output shafts and rotatable therewith;

first actuating means for shifting the synchronizing means toward or away from one of the forward input or output gears;

a reverse input gear integral with the input shaft;

an idler shaft supported in a parallel relationship with the input and output shafts within the housing assembly;

a reverse sliding gear mounted on the idler shaft;

a reverse output gear mounted on the output shaft;

second actuating means for shifting the reverse sliding gear into the meshing relationship with the reverse input and output gears;

a manual shift lever for changing gear ratios between the input shaft and the output shaft;

a shift and select shaft supported in a parallel relationship with the input and output shafts within the housing assembly and operatively connected to the manual shift lever;

a fork shaft slidably supported in a parallel relationship with the idler shaft within the housing assembly and operatively connected to the manual shift lever for being selectively shifted by the operation between its neutral, forward and reverse position;

a detent mechanism mounted in the housing assembly to retain selectively the fork shaft in its neutral or shift positions when subjected to a resilient load acting thereon, the detent mechanism comprising a first holder member and a second holder member, the first holder member being slidable on the shift and select shaft and rotatable relative to the housing assembly, rotation of the first holding member resulting in the movement of said synchronizing means, the first holding member rotating when shifting into reverse speed, the second holder member having an engagement member which selectively engages with the first holder member; and rotating means rotated by the manual shift lever, said rotating means being engaged with the first holder member when said first holder member slides upon shifting into reverse speed, rotation of the manual shift lever resulting in the rotation of the rotating means because of the engagement between the first projection and the second projection, this resulting in the net effect of the synchronizing means for a forward speed, whereby when the manual shift lever is shifted to a reverse speed, the synchronizing means for a forward speed are effected to stop the rotation of the input shaft by inertia and the synchronizing means associated with the reverse gear is maintained to its neutral position by the engagement member of the second holder member.

9. The gear shift mechanism of claim 1, wherein the first holder member has a first projection, a slot for permitting said rotation of the first holder member when shifting into reverse speed and a pawl which prevents a double shift in association with the first actuating means, the pawl including a means for retaining one of a synchronizing means associated with the reverse gear in its neutral position when the manual shift lever is shifted into said reverse speed and wherein said rotating means includes a second projection adapted to engage with the first projection of the first holder member.

10. The gear shift mechanism of claim 9, wherein the means for retaining the synchronizing means associated with the reverse gear in its neutral position is a groove.

11. The gear shift mechanism of claim 9, wherein the movement of the manual shift lever is transmitted to the shift forks and rotating means by the shift and select shaft connected with the manual shift lever at one end, the other end of the shift-and-select shaft penetrating the first holder member to rotate with the rotating means at the other end of the shift-and-select shaft.

12. The gear shift mechanism of claim 11, wherein the detent mechanism further comprises a locking means fixed onto the housing assembly for restricting the rotation of the first holder member, with the locking means projecting into the slot of the first holder member.

13. The gear shift mechanism of claim 12, wherein the slot of the first holder member comprising a first hole in which the locking means is slidable with the sliding motion of the shift-and-select shaft, and a second hole in which the first holder member can be rotated a limited amount to effect the synchronization of the synchronizing means.

14. The gear shift mechanism of claim 13, wherein the rotating means engages with the shift-and-select shaft, said rotating means comprising a flange portion extending radially outward therefrom, a shaft with an enlarged head portion, and a means for biasing the enlarged head portion toward the first projection of the first holder member.

15. The gear shift mechanism of claim 14, wherein the detent mechanism further comprises return springs which are provided between the shift and select shaft and the first holder member, retaining the shift-and-select shaft in its neutral position.

* * * * *